US008942832B2

(12) United States Patent
Shimizu

(10) Patent No.: US 8,942,832 B2
(45) Date of Patent: Jan. 27, 2015

(54) METHOD, ARTICLE OF MANUFACTURE, AND SYSTEM FOR CONFIGURING CONTROLLER IN SLIDING-MODE CONTROL SCHEME

(75) Inventor: Junya Shimizu, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 13/291,141

(22) Filed: Nov. 8, 2011

(65) Prior Publication Data

US 2012/0136462 A1    May 31, 2012

(30) Foreign Application Priority Data

Nov. 30, 2010  (JP) ................................. 2010-267280

(51) Int. Cl.
*G05B 13/02* (2006.01)
*G01M 1/38* (2006.01)
(52) U.S. Cl.
CPC .. *G05B 13/0205* (2013.01); *G05B 2219/42352* (2013.01); *G05B 2219/42343* (2013.01)
USPC ............................... 700/28; 700/32; 700/275
(58) Field of Classification Search
CPC ........... G05B 2219/42352; G05B 2219/39232; G05B 2219/42346
USPC .................... 700/19–20, 28–32, 275
See application file for complete search history.

(56) References Cited

U.S. PATENT DOCUMENTS

| | | | | | |
|---|---|---|---|---|---|
| 5,285,379 | A | * | 2/1994 | Gamble ........................ | 700/40 |
| 6,082,099 | A | * | 7/2000 | Yasui et al. .................... | 60/276 |
| 6,684,150 | B2 | * | 1/2004 | Yasui et al. .................. | 701/106 |
| 6,832,149 | B2 | * | 12/2004 | Fuwa ............................. | 701/102 |
| 7,216,006 | B2 | * | 5/2007 | Yasui et al. ..................... | 700/54 |
| 2003/0083799 | A1 | * | 5/2003 | Fuwa ............................. | 701/102 |
| 2003/0229407 | A1 | * | 12/2003 | Yasui et al. ..................... | 700/29 |
| 2005/0222695 | A1 | * | 10/2005 | Yoneda ........................... | 700/63 |
| 2006/0129250 | A1 | * | 6/2006 | Yasui et al. ..................... | 700/19 |
| 2006/0217871 | A1 | * | 9/2006 | Shimojo et al. ............... | 701/102 |

(Continued)

FOREIGN PATENT DOCUMENTS

| | | |
|---|---|---|
| JP | 05-080805 A | 4/1993 |
| JP | 2001115880 A | 4/2001 |

(Continued)

OTHER PUBLICATIONS

V. I. Utkin, "Sliding Mode Control," IEEE Transactions on Automatic Control, vol. AC-22, No. 2, Apr. 1977, pp. 212-222.

*Primary Examiner* — Darrin Dunn
(74) *Attorney, Agent, or Firm* — Jeff Tang

(57) ABSTRACT

Method, article of manufacture and system using minimum data to determine whether a sliding-mode control should be applied in a plant. First measure the plant in an open-loop control fashion, and using the measured data, describe a state equation of the plant by system identification and order determination methods. Then design a switching hyperplane for sliding-mode control. Next, calculate higher order statistics on the difference between an output of a linear model on the hyperplane and an output of the sliding-mode control model in the measured data; When any of the higher order moments is larger than a predetermined threshold, configure a controller as a sum of the linear control input term and the nonlinear control input term. If both higher-order moments are smaller than the threshold, then configure the controller using only a linear control input term.

15 Claims, 3 Drawing Sheets

(56) References Cited

U.S. PATENT DOCUMENTS

| | | | |
|---|---|---|---|
| 2007/0198163 A1* | 8/2007 | Yasui et al. | 701/103 |
| 2008/0097683 A1* | 4/2008 | Yasui et al. | 701/104 |
| 2008/0269955 A1* | 10/2008 | Yasui et al. | 700/299 |
| 2009/0099692 A1* | 4/2009 | Prisco et al. | 700/254 |
| 2009/0143871 A1* | 6/2009 | Gao et al. | 700/29 |
| 2011/0160904 A1* | 6/2011 | Prisco et al. | 700/254 |
| 2011/0166706 A1* | 7/2011 | Prisco et al. | 700/254 |
| 2011/0276150 A1* | 11/2011 | Al-Duwaish et al. | 700/28 |

FOREIGN PATENT DOCUMENTS

| | | |
|---|---|---|
| JP | 2001117626 A | 4/2001 |
| JP | 2001134302 A | 5/2001 |
| JP | 2003-015703 | 1/2003 |
| JP | 2004287733 A | 10/2004 |

* cited by examiner

US 8,942,832 B2

METHOD, ARTICLE OF MANUFACTURE, AND SYSTEM FOR CONFIGURING CONTROLLER IN SLIDING-MODE CONTROL SCHEME

CROSS-REFERENCE TO RELATED APPLICATIONS

This application claims priority under 35 U.S.C. §119 from Japanese Patent Application No. 2010-267280 filed Nov. 30, 2010, the entire contents of which are incorporated herein by reference.

BACKGROUND OF THE INVENTION

1. Field of the Invention

The present invention relates to a sliding-mode control scheme, and more particularly to a method, article of manufacture, and system for configuring a controller in the sliding-mode control scheme, including a technique to automatically determine whether or not a sliding-mode control should be applied from least minimum measured experimental data.

2. Description of Related Art

Conventionally, it is often the case that a controller is required to be sufficiently robust against non-linear characteristics and parameter variations/load variations included in a system. As one solution to cope with such requirement, a sliding-mode control (SMC) has been widely used. The SMC causes the state of a controlled object to reach a preset hyperplane and to be constrained thereto while switching the control input, and forces the state to slide to an equilibrium point thereby stabilizing the controlled object against uncertainty, nonlinearity, noises of parameters.

For example, in a position/attitude control of a satellite, a satellite has 6 degrees of freedom of movement of translations and rotations in a 3-dimensional space. Because of the many degrees of freedom, the control needs to be able to cope with variation uncertainties of a nonlinear equation for matching the attitude of the satellite to the attitude of an observation target and for controlling the position of the satellite so that it circles around an observation target while maintaining a constant distance therebetween.

Furthermore, along with the progress of exhaust emission regulation of engines, in order to accurately control an exhaust gas recirculation (EGR) mechanism and the like, a design by a plant model based on a feedback control of multi-input and multi-output system becomes necessary in place of a design based on open-loop control, so that a variable structure system control by a piecewise switching of control input is required.

However, it is often the case that the decision of the introduction of SMC for the targeted control relies on the model designer, and it is problematic that in order for such decision, the existence of nonlinearity needs to be verified based on a great deal of experimental results. Further, in SMC, while the nonlinearity is utilized in the control law for reaching a hyperplane, in a design which assumes an ideal, instantaneous switching of control-input switching, chattering will have occurred in the control input. To avoid that, although various smoothing has been used, it is also problematic that nonlinearity that defines space is not used.

While physical law description often results in nonlinearity, if, based on that, it is assumed that control strategy is also nonlinear to advance the design of the controller, extra cost will be spent on that. Moreover, the need for collecting a large number of experimental data for verifying the necessity of SMC has been a factor of increasing the cost. Further, it is problematic that in a reaching control law in which nonlinearity is not exploited, a sufficient control effect may not be obtained.

Japanese Patent Laid-Open No. 05-80805 discloses a technique for enabling the introduction of sliding-mode control and adaptive control by utilizing a conventional linear control technology, in which the phase surface of a sliding mode is represented by a form in which a torque command determined by conventional linear control is divided by an integration gain K2, and a Liapunov function is adapted to take into consideration estimated values of an inertia, a coefficient of dynamic friction and a gravity term of an object to be controlled, so that respective linear control gains Kp, K1 and K2 are determined so as to always make the Liapunov function negative and an auxiliary input is determined by changing the above described respective estimated values.

Japanese Patent Laid-Open No. 2003-15703 discloses that to provide a control apparatus of a plant capable of identifying a model parameter by modeling a plant to be controlled, and further stabilizing control at the time of executing sliding-mode control by using the identified model parameter, a model parameter identifier calculates a model parameter vector $\theta$ in a format in which an updated vector $d\theta$ is added to a reference vector $\theta$base of the model parameter, corrects the updated vector $d\theta$ by multiplying the past value of at least one element of the updated vector $d\theta$ by a predetermined value which is larger than 0 and smaller than 1, and calculates the model parameter vector $\theta$ by adding the updated vector $d\theta$ after correction to the reference vector $\theta$base.

Further, in the section 3.1 of the first edition of Kenzo Nonami and Hong-Qi Tian, "Sliding-mode Control (in Japanese)", CORONA PUBLISHING CO LTD., Oct. 20, 1994, a design method of switching hyperplane is described, and in the section 3.2, a design method of sliding-mode controller is described.

However, although the above described references disclose a design technique for sliding-mode control, they do not suggest a technique for easily determining whether or not the sliding-mode control should be applied.

SUMMARY OF THE INVENTION

It is an object of the present invention to provide a technique to automatically determine whether or not a sliding-mode control should be applied in a plant from least minimum measured experimental data.

In one aspect, a method according to the present invention first measures the plant in an open-loop control fashion. Then, using the measured data, the method describes a state equation of the plant by an existent system identification method and an order determination method. Further, the method designs a switching hyperplane for sliding-mode control based on a state equation of the plant which has undergone system identification.

Next, the method calculates a higher order statistic on the difference between the output of a nominal model when constrained to the hyperplane (that is, the output when only a control input of a linear model is used), and the output when a control input of sliding-mode is used, where, particularly, a third-order moment and a fourth-order moment are calculated. Then, when the value of the third-order moment is larger than a predetermined threshold, or the value of the fourth-moment is larger than a predetermined threshold, the method determines that sliding-mode control is valid, and calculates nonlinear control input term that is updated at each sampling time by using the value of the fourth moment. Then, the method configures a controller as a sum of the linear control input term and the nonlinear control input term.

On one hand, when having determined that both of the value of the third-order moment and the value of the fourth-order moment are smaller than a predetermined threshold, the method configures a controller by using only a linear control input term.

In another aspect, an article of manufacture tangibly embodying computer readable non-transitory instructions first measures the plant in an open-loop control fashion. Then, using the measured data, the article describes a state equation of the plant by an existent system identification method and an order determination method. Further, the article of manufacture having the instructions designs a switching hyperplane for sliding-mode control based on a state equation of the plant which has undergone system identification.

Next, the article of manufacture allows calculation of a higher order statistic on the difference between the output of a nominal model when constrained to the hyperplane (that is, the output when only a control input of a linear model is used), and the output when a control input of sliding-mode is used, where, particularly, a third-order moment and a fourth-order moment are calculated. Then, when the value of the third-order moment is larger than a predetermined threshold, or the value of the fourth-moment is larger than a predetermined threshold, the article determines that sliding-mode control is valid, and calculates nonlinear control input term that is updated at each sampling time by using the value of the fourth moment. Then, the article configures a controller as a sum of the linear control input term and the nonlinear control input term.

On one hand, when having determined that both of the value of the third-order moment and the value of the fourth-order moment are smaller than a predetermined threshold, the article of manufacture configures a controller by using only a linear control input term.

In a further aspect, a system according to the present invention first measures the plant in an open-loop control fashion. Then, using the measured data, the system describes a state equation of the plant by an existent system identification method and an order determination method. Further, the system designs a switching hyperplane for sliding-mode control based on a state equation of the plant which has undergone system identification.

Next, the system calculates a higher order statistic on the difference between the output of a nominal model when constrained to the hyperplane (that is, the output when only a control input of a linear model is used), and the output when a control input of sliding-mode is used, where, particularly, a third-order moment and a fourth-order moment are calculated. Then, when the value of the third-order moment is larger than a predetermined threshold, or the value of the fourth-moment is larger than a predetermined threshold, the system determines that sliding-mode control is valid, and calculates nonlinear control input term that is updated at each sampling time by using the value of the fourth moment. Then, the system configures a controller as a sum of the linear control input term and the nonlinear control input term.

On one hand, when having determined that both of the value of the third-order moment and the value of the fourth-order moment are smaller than a predetermined threshold, the system configures a controller by using only a linear control input term.

In an advantage according to the present invention, because the validity of the introduction of sliding-mode control can be determined from least minimum measured data, the need for repeating data collection experiments is obviated. Moreover, it becomes possible to design a controller more appropriate than conventional one based on a statistic which is utilized when the above described determination is made.

A further advantage of the present invention is it becomes possible to avoid chattering and perform stable control for an accidental disturbance with an inexpensive controller. The advantage holds even for a system such as a satellite, in which it is difficult to install a high-speed switching function, etc. . . .

Other characteristics and advantages of the invention will become obvious in combination with the description of accompanying drawings, wherein the same number represents the same or similar parts in all figures.

DETAILED DESCRIPTION OF THE PREFERRED EMBODIMENTS

Hereafter, according to the drawings, embodiments of the present invention will be described. It is to be understood that these embodiments are for the sake of explaining preferable modes of the present invention, and the scope of the present invention is not intended to be limited to what is shown here. Moreover, throughout the drawings shown below, unless otherwise stated, like reference symbols refer to the like objects.

The basic principle of the invention is to provide a technique to automatically determine whether or not a sliding-mode control should be applied in a plant by using least amount of measured experimental data. Detailed description of the invention is made in combination with the following embodiments.

Figure 1:
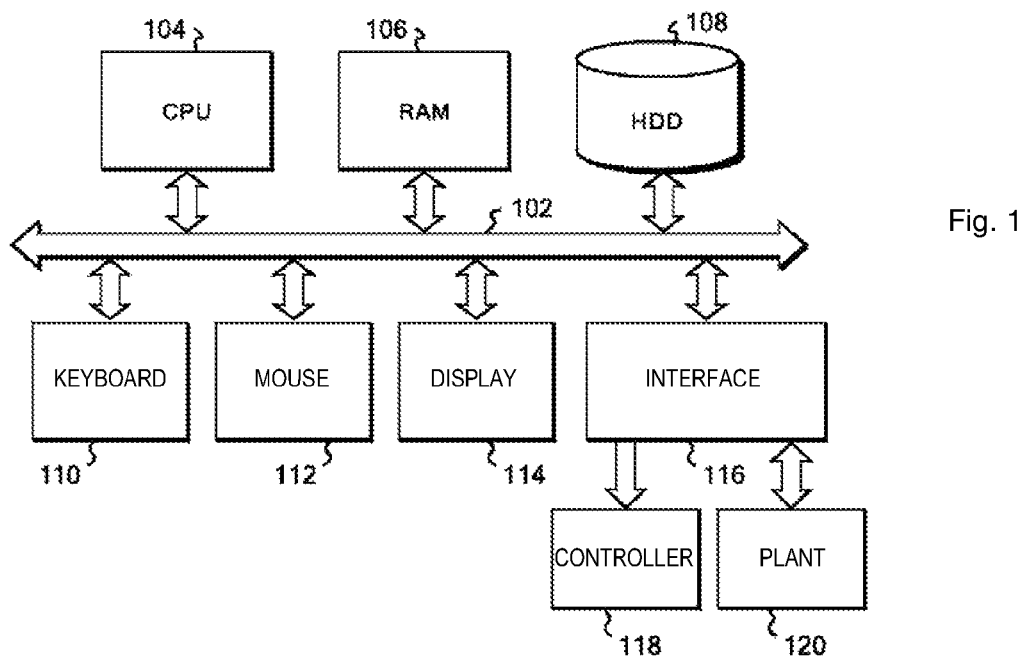
FIG. 1 illustrates a schematic block diagram of an embodiment of the computer to be used in the present invention.

Referring to FIG. 1, a block diagram of hardware of a control computer for controlling a controller 118 according to an embodiment of the present invention is shown. In FIG. 1, a CPU 104, a main memory (RAM) 106, a hard disk drive (HDD) 108, a keyboard 110, a mouse 112, and a display 114 are connected to a system bus 102. The CPU 104, which is preferably based on a 32-bit or 64-bit architecture, can utilize, for example, PENTIUM™ 4 of Intel Corporation, Core™ 2 DUO of Intel Corporation, Athlon™ of Advance Micro Devices, and the like. The main memory 106 preferably has a capacity of 2 GB or more, and more preferably a capacity of 4 GB or more.

In the hard disk drive 108, although not shown individually, operating system and processing programs, etc. relating to the present invention are prestored. The operating system can be any one that conforms to the CPU 104, such as Linux™; Windows™ 7, Windows XP™, and Windows™ 2000 of Microsoft Corporation; and Mac OS™ of Apple Inc., etc.

The keyboard 110 and the mouse 112 are used to manipulate graphic objects such as icons, a task bar, a window, etc. which are displayed on the display 114 according to a graphic user interface supported by the operating system. The keyboard 110 and the mouse 112 are also used to operate a data recording program to be described below.

The display 114 is preferably, though not limited to, an LCD monitor having a resolution of 1024×768 or more with 32 bit true color. The display 114 is used for displaying, for example, a waveform of the operation of the plant 120 through the control by the controller 118.

Further, the hard disk drive 108 prestores a measurement module 204, a system identification module 206, a higher-order statistic calculation module 208, a nonlinear control input term calculation module 210, a controller configuration module 212, and a main program 202 (i.e. computer readable instructions) that integrates the whole processing, which are to be described below. These modules can be created by using any existing programming language such as C, C++, C#, Java®, etc. These modules are appropriately loaded onto the main memory 106 and executed by the working of the operating system. Although not shown, the main program 202 can display a window that is to be operated by the operator on the display 114, so that the operator can start or stop the processing by using the keyboard 110 and the mouse 112, etc.

The controller 118 and the plant 120 are connected to the bus 102 via an appropriate interface board 116. The controller 118 has a register in which a control input obtained from the result of calculation can be set through the interface board 116.

The measurement module 204 has a function of supplying a series of signals to the plant 120 via the bus 102 and the interface board 116, and measuring responses thereto.

The system identification module 206 uses, although not limited to, for example, a system identification method which uses a state equation in its parametric model. In the case of a parametric model, model order determination processing is also performed collectively as a structure determination step. Next, processing such as estimating parameters by a prediction error method, and estimating a state space model by a subspace method, etc. . . are performed. As the system identification module 206, although not limited to, the System Identification Toolbox of MATLAB® can be used. The system identification module 206 generates a state space equation as a result of system identification. For details of system identification processing, refer to, for example, Shuichi Adachi, "Foundation of system identification (in Japanese)", TOKYO DENKI UNIVERSITY, Sep. 10, 2009.

Further, in this embodiment, the system identification module 206 designs a formula of a switching hyperplane for sliding-mode control from the generated state space equation. It is noted that the design of a switching hyperplane for sliding-mode control can be referred to Kenzo Nonami and Hong-Qi Tian, "Sliding-mode Control (in Japanese)", section 3.1, CORONA PUBLISHING CO LTD., Oct. 20, 1994 and so on.

The higher-order statistic calculation module 208 has a function of calculating higher order statistics, particularly a third-order moment and a fourth-order moment of the output signal of the plant 120.

The nonlinear control input term calculation module 210 has a function of calculating a nonlinear control input term peculiar to sliding-mode control at each sampling time. During this calculation, the value of fourth-order moment calculated at the higher-order statistic calculation module 208 is used.

The controller configuration module 212 has a function of configuring the controller 118 by using only the control input term based on a nominal model resulted from system identification, that is, a linear model when constrained to a hyperplane, or both of the control input term based on the linear model when constrained to the hyperplane and the nonlinear control input term.

The plant 120 can be a mechanical apparatus to be controlled, such as an engine, brake and an air conditioner of automobile, a satellite, and the like.

The plant 120 is typically a real machine, but may be a software-type model created by a simulation modeling tool such as Simulink®, Modelica, and the like. When the plant 120 is a software-type model, it will be a module stored in the hard disk drive 108, and accordingly interfacing via the interface board 116 is unnecessary since the controller 118 will be a module stored in the hard disk drive 108 as well.

Figure 2:
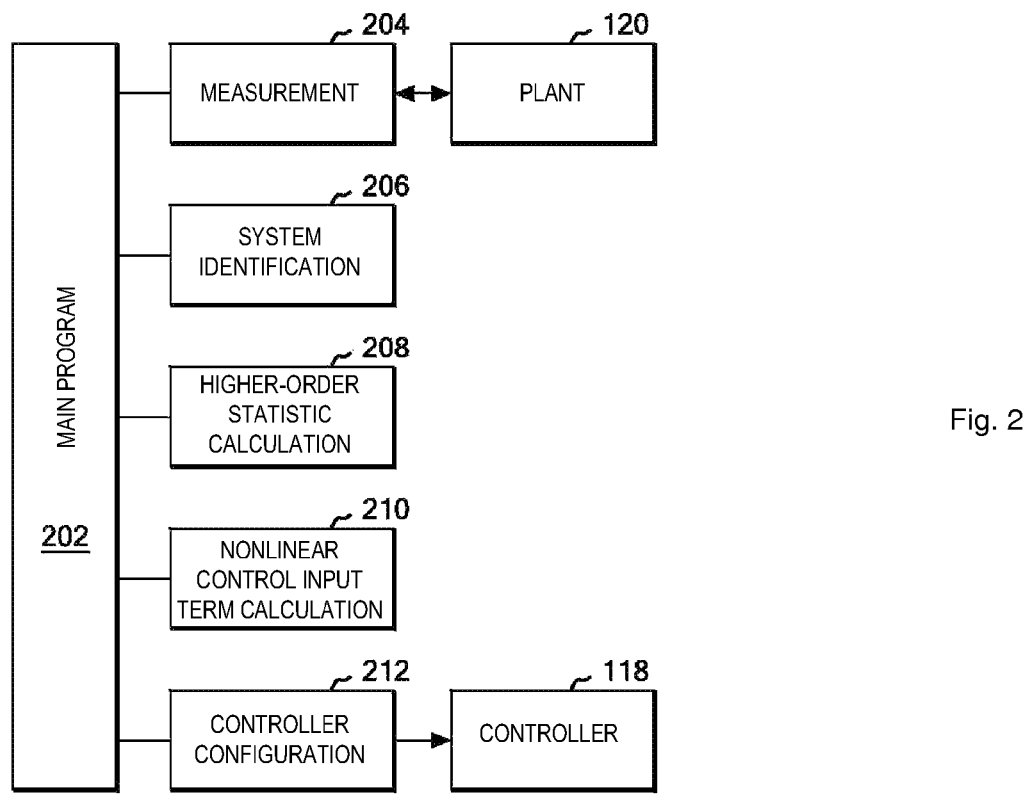
FIG. 2 illustrates a functional block diagram of a program etc. for executing the processing to determine a controller according to an embodiment of the present invention.
Figure 3:
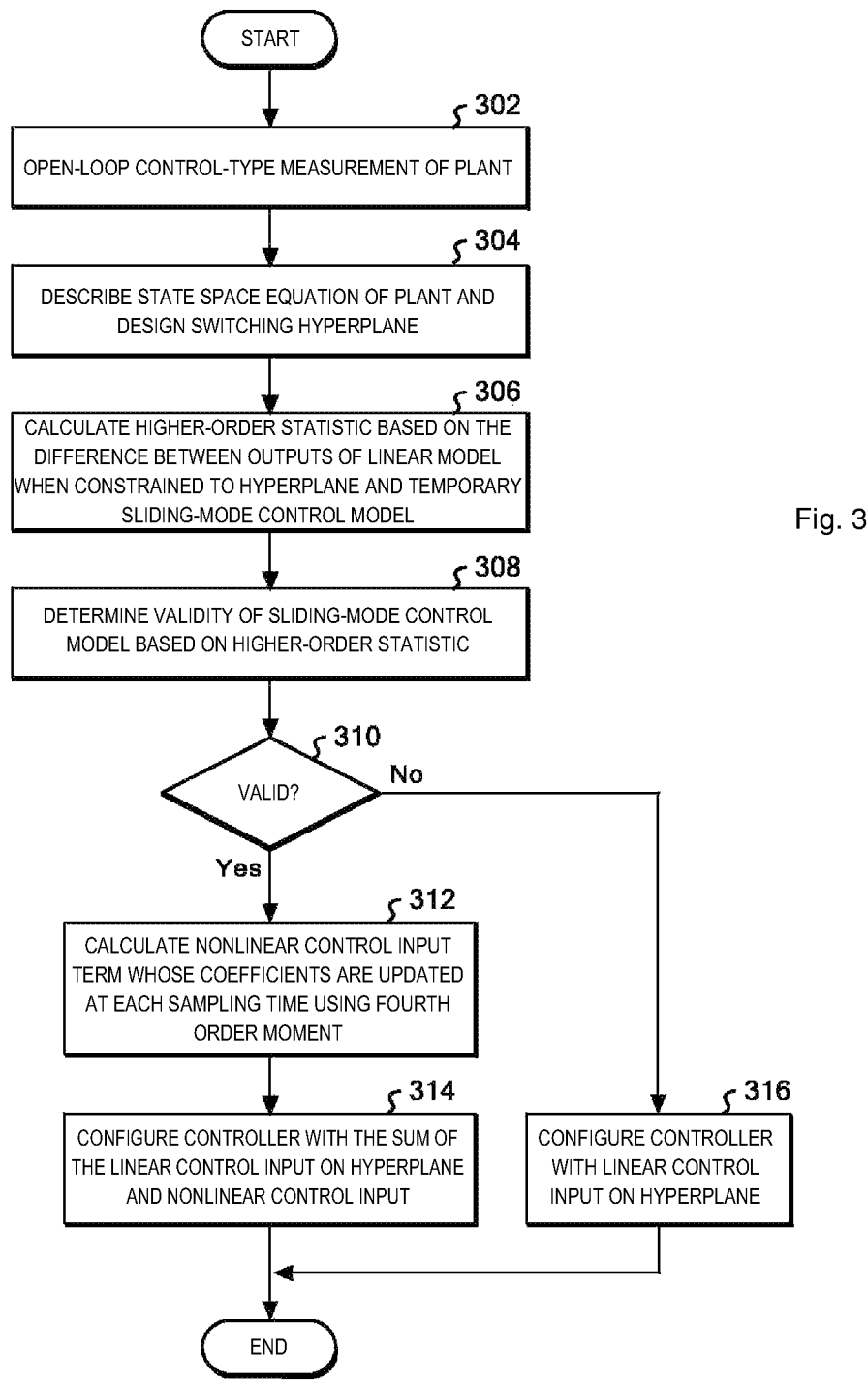
FIG. 3 shows an exemplary flowchart for executing the processing to determine a controller according to an embodiment of the present invention.

Next, with reference to the flowchart in FIG. 3, details of the processing executed by a functional logic configuration of FIG. 2 will be described.

In step 302, the main program 202 calls the measurement module 204, and performs an open-loop measurement for the plant 120 by supplying measured signals at a predetermined sampling period. In the case of a closed loop measurement, since it is difficult to grasp a cause and effect relationship for a signal input, an open-loop measurement is preferable from the stand point of simply grasping a response output corresponding to a measured signal.

When response outputs are accumulated in this way, the main program 202 calls the system identification module 206 to identify a state space equation of the plant 120 preferably by using a parametric model and then an order-determination technique. The system identification module 206 designs a hyperplane for sliding-mode control from the thus obtained state space equation of the plant 120. Thus, a model described by the following formulas is obtained:

$$\dot{X}=AX+BU$$

$$Y=CX$$

$$\sigma=SX$$

Where, X in input, Y is output, U is control input, and A, B, and C determined by system identification are a coefficient matrix. Further, $\sigma$ is a hyperplane, and S is a matrix to define the switching hyperplane determined based on A, B, and C.

Here, the main program 202 calls the higher-order statistic calculation module 208 to calculate a data observation sequence $\{S\}=y_{tempSMC}-y_{1inear}$ when letting the output of the nominal mode, that is, a linear model when constrained to the hyperplane be $y_{1inear}$, and the output of a temporary sliding-mode control model be $y_{tempSMC}$.

Further, the main program 202 calculates an average value of the data observation sequence $\{S\}$, letting it be $$\bar{s}$$

and calculates a data sequence $\{x\}$ whose average value is made zero as shown below.

$$x(j)=s(j)-\bar{s}, j=1,\ldots,n$$

Then, the higher-order statistic calculation module 208 calculates a third-order moment:

$$c_3(d_1,d_2)=E[x(n)x(n+d_1)x(n+d_2)]$$

and a fourth-order moment:

$$c_4(d_1,d_2,d_3)=E[x(n)x(n+d_1)x(n+d_2)x(n+d_3)]-E[x(n)x(n+d_1)]E[x(n+d_2)x(n+d_3)]-E[x(n)x(n+d_2)]E[x(n+d_1)x(n+d_3)]-E[x(n)x(n+d_3)]E[x(n+d_1)x(n+d_2)]$$

by using the data sequence $\{x\}$. Where, E[ ] is an expected value, and $d_1$, $d_2$, and $d_3$ are lags or delays. The values of $d_1$, $d_2$, and $d_3$ are appropriately determined in advance, and for example, they can be such that $d_1=d_2=d_3=0$.

The main program 202 determines a validity of the sliding-mode control model using thus calculated values of the third-order moment and the fourth-order moment, in step 308.

That is, the main program 202 predetermines a threshold $Th_3$ for the value $c_3$ of the third-order moment, and a threshold $Th_4$ for the value $c_4$ of the fourth-order moment, and when determining that $|c_3|>Th_3$ or $|C_4|>Th_4$, the main program 202 determines that using the sliding-mode control model is valid. On one hand, when $|c_3|<=Th_3$ and $|c_4|<=Th_4$, the main program 202 determines that using the sliding-mode control model is not valid.

When the main program 202 determines that using the sliding-mode control model is not valid in step 310, the process moves to step 316, and the main program 202 calls the controller configuration module 212 to configure the controller 118 with a control input of the linear model when constrained to the hyperplane, as shown in the following formula.

$$u_{linear} = -(SB)^{-1}(SAX)$$

When the main program 202 determines that using the sliding-mode control model is valid in step 310, the process moves to step 312, and the main program 202 calls the nonlinear control input term calculation module 210 to calculate a coefficient $k_t$ of the control input whose coefficient k is updated at each sampling time t according to the following formula, by using the fourth-order moment calculated in step 306.

$$k_t = k_{t-1} - \mu\{1+(-sign(\kappa_4)\tan h(\|X\|)-\|X\|)\|X\|\}k_{t-1}$$

Where, $\mu$ is a step constant, for example, 0.17. The sign( ) is a function to return a sign. Moreover, $\kappa_4$ is the fourth-order moment calculated in step 306, and in one example, $\kappa_4=c_4(0, 0, 0)$. This formula is a recurrence formula, and $k_t$ is established at the end of sampling time so that the value is used as k for nonlinear control input term.

It is noted that the coefficient $k_t$ may not be calculated at each sampling time t, and the number of sampling times t can be decimated to calculate the coefficient as follows:

$$k_m = k_{m-1} - \mu\{1+(-sign(\kappa_4)\tan h(\|X\|)-\|X\|)\|X\|\}k_{m-1} m \leftarrow m+1 \text{ if } mod(t,3)=1$$

Such a formula is decided under the consideration that since the characteristic of space leading to the hyperplane has a bias in terms of higher-order moment, controlling the approach to the hyperplane via a gradient that takes the bias into consideration will make chattering less likely to occur. This also has a meaning that it is an updating formula to approximate a partial differential of negentropy. To add further description, this is a formula based on the result of consideration that deviation of the sliding-mode control model from a nominal model corresponds to bringing the difference between the entropy of Gaussian distribution and the entropy that the norm of state quantity X closer to zero. As a result of this, the nonlinear input term is determined as follows:

$$u_{nonlinear} = -k_t(SB)^{-1}\frac{\sigma}{\|\sigma\|}$$

The main program 202, in step 314, calls the controller configuration module 212, and configures the controller 118 with the sum of the control input term of the linear model when constrained to the hyperplane, and the nonlinear control input term calculated in step 312, as shown in the following formula:

$$u = u_{linear} + u_{nonlinear} = -(SB)^{-1}(SAX) - k_i(SB)^{-1}\frac{\sigma}{\|\sigma\|}$$

Figure 4:
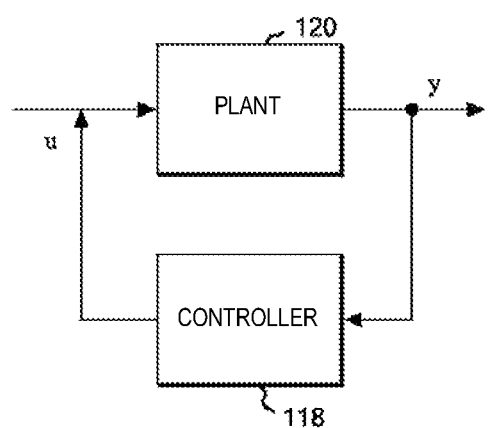
FIG. 4 shows an exemplary relationship between a plant and a controller according to an embodiment of the present invention.

FIG. 4 is a schematic diagram to show the situation where a plant is controlled by the controller 118 which is configured as described above. The control input u of the controller 118 is fed back to the plant 120.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions. In particular, the present invention will not be limited to a specific platform of hardware and software etc., and can be implemented on any platform.

I claim:

1. A method of configuring a controller for a plant using a sliding-mode control scheme, the method comprising:
   obtaining a measured observation data sequence by an open-loop control measurement of the plant;
   describing a state space equation of the plant by a system identification technique based on the measured value, and designing a switching hyperplane for a sliding-mode control model;
   calculating a third-order statistic and a fourth-order statistic on a difference between an output of a linear model on the hyperplane and an output of the sliding-mode control model in the observation data sequence;
   calculating a nonlinear control input term based on a fourth-order moment if either of the third-order statistic and the fourth-order statistic is larger than a predetermined threshold, and configuring a controller by a sum of a control input term of the linear model on the hyperplane and the nonlinear control input term; and
   configuring a linear controller with a linear control input on the hyperplane if both the third-order statistics and the fourth-order statistics are smaller than the predetermined threshold.

2. The method according to claim 1, wherein
   the nonlinear control input includes a fourth-order statistic of the difference of the observation data sequence.

3. The method according to claim 2, wherein
   the nonlinear control input is subject to updating of a coefficient at each sampling time.

4. The method according to claim 2, wherein
   the nonlinear control input is subject to updating of a coefficient at a sampling time after decimation.

5. The method according to claim 2, wherein
   the nonlinear control input includes a formula that approximates a partial differential of negentropy, which represents a gradient for approaching to the hyperplane.

6. An article of manufacture tangibly embodying computer readable non-transitory instructions which, when implemented, cause a computer to carry out the steps of a method comprising:
   obtaining a measured observation data sequence by an open-loop control measurement of a plant;
   describing a state space equation of the plant by a system identification technique based on the measured value, and designing a switching hyperplane for a sliding-mode control model;

calculating a third-order statistic and a fourth-order statistic on a difference between an output of a linear model on the hyperplane and an output of the sliding-mode control model in the observation data sequence;

calculating a nonlinear control input term based on a fourth-order moment if either of the third-order statistic and the fourth-order statistic is larger than a predetermined threshold, and configuring a controller by a sum of a control input term of the linear model on the hyperplane and the nonlinear control input term; and configuring a linear controller with a linear control input on the hyperplane if both the third-order statistics and the fourth-order statistics are smaller than the predetermined threshold.

7. The article of manufacture according to claim 6, wherein the nonlinear control input includes a fourth-order statistic of the difference of the observation data sequence.

8. The article of manufacture according to claim 7, wherein the nonlinear control input is subject to updating of a coefficient at each sampling time.

9. The article of manufacture according to claim 7, wherein the nonlinear control input is subject to updating of a coefficient at a sampling time after decimation.

10. The article of manufacture according to claim 7, wherein
the nonlinear control input includes a formula that approximates a partial differential of negentropy, which represents a gradient for approaching to the hyperplane.

11. A controller configuring system for configuring a controller for a plant by using a sliding-mode control scheme, the controller configuring system comprising:
a memory:
a processor communicatively coupled to the memory: and
a feature selection module communicatively coupled to the memory and the processor, wherein the feature selection module is configured to perform the steps of a method comprising:

obtaining a measured observation data sequence by an open-loop control measurement of the plant;

describing a state space equation of the plant by a system identification technique based on the measured value, and designing a switching hyperplane for a sliding-mode control model;

calculating a third-order statistic and a fourth-order statistic on a difference between an output of a linear model on the hyperplane and an output of the sliding-mode control model in the observation data sequence;

calculating a nonlinear control input term based on a fourth-order moment if either of the third-order statistic and the fourth-order statistic is larger than a predetermined threshold, and configuring a controller by a sum of a control input term of the linear model on the hyperplane and the nonlinear control input term; and configuring a linear controller with a linear control input on the hyperplane in response to that both the third-order statistics and the fourth-order statistics are smaller than the predetermined threshold.

12. The controller configuring system according to claim 11, wherein
the nonlinear control input includes a fourth-order statistic of the difference of the observation data sequence.

13. The controller configuring system according to claim 12, wherein
the nonlinear control input is subject to updating of a coefficient at each sampling time.

14. The controller configuring system according to claim 12, wherein
the nonlinear control input is subject to updating of a coefficient at a sampling time after decimation.

15. The controller configuring system according to claim 12, wherein
the nonlinear control input includes a formula that approximates a partial differential of negentropy, which represents a gradient for approaching to the hyperplane.

* * * * *